United States Patent [19]
Schumacher

[11] 3,999,636
[45] Dec. 28, 1976

[54] SELF-ADJUSTING BRAKE CONSTRUCTION
[75] Inventor: Gary B. Schumacher, Navarre, Ohio
[73] Assignee: Aspro, Incorporated, Canton, Ohio
[22] Filed: Oct. 31, 1975
[21] Appl. No.: 627,543
[52] U.S. Cl. .................. 188/79.5 GC; 188/196 BA
[51] Int. Cl.$^2$ ........................................ F16D 65/56
[58] Field of Search ............ 188/79.5 GC, 79.5 GT, 188/79.5 GE, 196 BA

[56]  References Cited
UNITED STATES PATENTS

| 3,128,849 | 4/1964  | Swift  | 188/79.5 GC |
|-----------|---------|--------|-------------|
| 3,160,236 | 12/1964 | Riddy  | 188/79.5 GC |
| 3,358,795 | 12/1967 | Guest  | 188/79.5 GC |

Primary Examiner—Duane A. Reger
Attorney, Agent, or Firm—Frease & Bishop

[57] ABSTRACT

A self-adjusting brake having a pair of brake shoes movably mounted and arranged in end-to-end relationship on a fixed backing plate. A pair of levers is pivotally mounted on the backing plate. The levers are interposed between a pair of opposed brake shoes and a hydraulic actuator for moving the brake shoes into engagement with the brake drum. A brake gap adjuster extends between and separates the other opposed ends of the brake shoes. The adjuster includes a rod having a threaded end engaged within a threaded bore of a first hollow sleeve, and a smooth end rotatably mounted within a smooth bore of a second hollow sleeve. A driving washer having camming surfaces is spring biased into meshed engagement with complementary camming surfaces of a driven washer which is fixedly mounted on the adjuster rod. The driving washer is rotatably mounted on the adjuster rod and is operatively connected to one of the brake levers through a bellcrank lever and rigid connecting rod. Operation of the hydraulic actuator moves the brake shoes outwardly, which pivots the brake levers inwardly, which in turn, rotates the meshed washers through the bellcrank lever and connecting rod to threadably advance the adjuster rod out of the first sleeve, which increases the spacing between the brake shoes, thereby regulating the brake gap upon wearing of the brake lining.

9 Claims, 8 Drawing Figures

SELF-ADJUSTING BRAKE CONSTRUCTION

BACKGROUND OF THE INVENTION

1. Field of the Invention

The invention relates to vehicle brakes and in particular to self-adjusting mechanisms for such brakes. More particularly, the invention relates to a brake construction having a low cost self-adjusting strut assembly, which is actuated by a positive action of a push rod, which in turn is controlled by the inward movement of a brake shoe actuating lever upon the outward braking movement of the brake shoes.

2. Description of the Prior Art

Numerous brake constructions having self-adjusting mechanisms incorporated therein have been developed to automatically adjust the brake gap between the brake lining and brake drum to compensate for wearing of the brake lining. Such automatic adjuster mechanisms eliminate the need of a trained serviceman for manually adjusting the brake gap at periodic intervals as heretofore required.

Known self-adjusting brake constructions use various adjuster devices, as well as control means therefor. These adjusters operate either upon outward movement of the brake shoes, or retraction of the brake shoes, with the brake shoes being actuated by either a hydraulic service brake or a manually operated parking brake, or both. Likewise, various types of control cables and linkages are used to actuate the adjuster upon movement of the brake shoes. Cable actuated adjusters use a flexible cable, which operatively interconnects and extends between the adjuster and one of the brake shoes. Outward movement of the brake shoes through the brake gap for contact with the brake drum applies tension to the cable, which in turn advances an adjusting nut or threaded sleeve of the adjuster through rotation of a ratchet wheel or similar device. Such cable actuated adjusters are satisfactory where the particular brake construction enables tension to be applied to the cable during the outward movement of the brake shoes. It is difficult, however, to use a cable actuated adjuster in those brake constructions where the force is applied to the adjuster by the inward movement of the brake shoe or a component thereof due to the length of cable, number of pulleys, etc., required to achieve the necessary change of force direction.

Numerous self-adjusting brake constructions use various specially designed adjuster units to achieve the automatic brake gap adjustment and use various meshing cams, pinion gears, helical adjustment rods, etc. Examples of these constructions are shown in U.S. Pat. Nos. 2,835,354, 3,299,993, 3,299,994, 3,299,995, 3,334,709, 3,507,369, and 3,526,303. Such specially designed adjuster units, however, require specially constructed and machined parts for their successful operation, which increases considerably the cost of the completed brake assembly.

Other types of self-adjusting units use spring means to supply the force which is transmitted from the brake shoe movement to the adjuster, to advance a threaded adjuster rod from within an adjuster sleeve. Examples of such spring devices are shown in U.S. Pat. Nos. 2,695,078 and 3,232,392, wherein a torsion spring and a spring finger provide the adjusting means for regulating the separation of the brake shoes. It is desirable in many brake applications to have a more positive means for applying the force to the gap adjuster, since spring characteristics change due to wear, age, climate conditions, etc., and are susceptible to breakage and maintainence problems.

Thus, the need has existed for a self-adjusting brake construction, which is low in cost, which eliminates expensive specially manufactured adjuster units, which has positive force applying means for operating the adjuster unit to regulate the brake gap, and in which the brake gap regulating force is supplied to the adjuster unit by an inwardly moving brake component through a rigid push rod during outward movement of the brake shoes.

SUMMARY OF THE INVENTION

Objectives of the invention include providing an expanding vehicle brake with automatic means for adjusting the gap between the brake shoes and the brake drum to compensate for the wear of the brake lining carried by the shoes; providing an automatic adjuster for a vehicle brake wherein two relatively movable cam washers having ratchet teeth thereon are spring-biased into driving engagement, in which one of the cam washers is freely rotatably mounted on a threaded rod of an adjusting strut and is connected to a rigid push rod, which in turn is connected to a swinging end of a lever, the other end of which is interposed between an end of a hydraulic actuator and one of the brake shoes; providing such an automatic brake adjuster wherein the cam washers are inexpensive, readily available components, easily assembled with a usual starwheel manual adjusting strut to provide a low cost and durable adjuster mechanism for the improved brake construction; providing an improved brake construction, which is actuated by the inward movement of a brake component upon the outward expansion of the brake shoes reducing the amount of operating linkage heretofore required for similar sefl-adjusting brake constructions, and in which the mechanism is operated both upon operation of the manually actuated parking brake and hydraulically actuated service brake; and providing such an automatic self-adjusting brake construction which eliminates difficulties heretofore encountered, achieves the various objectives, simply, efficiently and effectively, and solves problems and satisfies existing needs.

These objectives and advantages are obtained by the self-adjusting brake construction in combination with a rotatable brake drum, the general nature of which self-adjusting brake construction may be stated as including a backing plate fixedly mounted on a stationary part of a vehicle; first and second brake shoes movably mounted in end-to-end relationship on the backing plate and expandable outwardly toward the brake drum; each of the brake shoes having a friction lining adapted to engage the brake drum; an expandable hydraulic brake actuator mounted on the backing plate and located between a pair of opposed ends of the brake shoes; first and second lever means pivotally mounted on the backing plate, each of the lever means having a camming end portion and a swinging end portion; a bellcrank lever pivotally mounted on the first brake shoe; rigid control rod means operatively connecting an end of the bellcrank lever with the swinging end portion of the first lever means; brake gap adjuster means mounted on and extending between the other pair of opposed brake shoe ends, said adjuster means including first and second tubular sleeves, the first sleeve having an internally threaded bore and the second sleeve having a smooth internal bore, and rod means having a threaded end portion and an opposite smooth end portion, said threaded end portion being threadably engaged within the threaded bore of the first tubular sleeve and the smooth end portion being rotatably mounted within the smooth bore of the second tubular sleeve; first and second washer means each having a plurality of camming surfaces adapted to be drivingly engaged with the camming surfaces of the other washer means; the first washer means being fixedly mounted on the rod means with the second washer means being rotatably mounted on the rod means between the first washer means and the threaded end portion; spring means biasing the camming surfaces of the second washer means into driving engagement with the camming surface of the first washer means; pin means extending from the second washer means and connecting the other end of the bellcrank lever with the second washer means; and each of the camming end portions of the lever means being interposed between and respectively engaged with an end of the hydraulic actuator and one of said ends of the brake shoes, whereby operation of the hydraulic actuator pivots the lever means expanding the brake shoes outwardly towards engagement with the brake drum and moving the swinging lever end portions inwardly, the inward movement of the first lever swinging end portion rotates the bellcrank lever through the rigid control rod means which in turn rotates the second washer means and subsequently the first washer means through the driving engagement of the washer means camming surfaces with the rotation of the first washer means advancing the threaded rod portion outwardly of the first tubular sleeve in relationship to the increased travel distance of the first brake shoe lining through the brake gap required to contact the brake drum due to the wearing of the brake lining, and with the second washer means returning to its former position upon return of the brake shoes.

BRIEF DESCRIPTION OF THE DRAWINGS

A preferred embodiment of the invention — illustrative of the best mode in which applicant has contemplated applying the principles — is set forth in the following description and shown in the drawings and is particularly and distinctly pointed out and set forth in the appended claims.

Similar numerals refer to similar parts throughout the drawings.

DESCRIPTION OF THE PREFERRED EMBODIMENT

Figure 1:
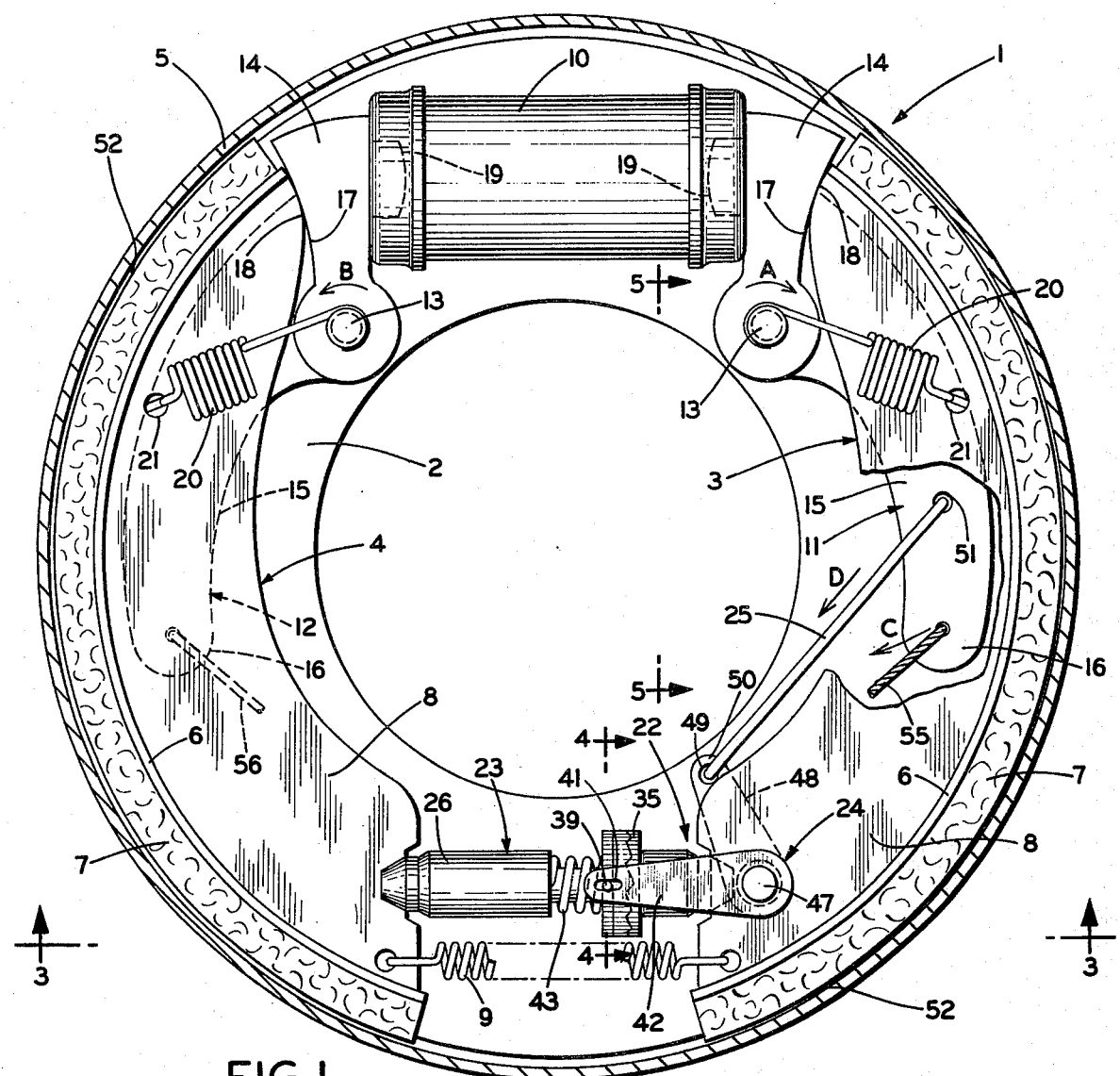
FIG. 1 is a front elevational view of the improved self-adjusting brake construction, mounted within a brake drum shown in section.

The improved self-adjusting brake construction is indicated generally at 1 (FIG. 1). Brake 1 includes a usual backing plate 2, which is adapted to be mounted on a fixed part of a vehicle axle. A pair of brake shoes 3 and 4 are slidably mounted on backing plate 2 in end-to-end relationship for engagement with a rotatable brake drum 5. Brake shoes 3 and 4 each have a rim 6 with a lining 7 of frictional material mounted thereon and a transverse web 8 attached at its outer edge to rim 6.

A usual hydraulically operated brake actuator cylinder 10 is mounted on backing plate 2 and is located between the upper pair of adjacent brake shoe ends. A pair of similar levers 11 and 12 is pivotally mounted by pins 13 on backing plate 2 adjacent cylinder 10. Levers 11 and 12 each include a thrust transmitting camming portion 14, which extends between the upper pair of brake shoe ends and cylinde 10, and a second elongated arcuate swing end portion 15 which is located between the respective brake shoes and backing plate 2 such as shown in pending application, Ser. No. 627,250, filed Oct. 30, 1975, and which is assigned to the same Assignee as is this application. Ends 16 of lever portions 15 preferably are the locations of connections with a manual parking brake actuating mechanism (not shown), which forms no part of improved brake construction 1, and which may be of the type shown in my copending application, Ser. No. 627,250, filed Oct. 30, 1975.

Lever portions 14 each have an arcuate camming edge 17, which slidably engage curved camming edges 18 of the upper brake shoe ends. Piston contact lugs 19 project inwardly into the ends of cylinder 10 and engage the ends of a double acting piston (not shown) mounted within cylinder 10. Return springs 20 are connected at one end to shoes 3 and 4 through holes 21 and at their other ends to pivot pins 13 for returning the brake shoes to their released or unactuated position of FIG. 1.

Figure 2:
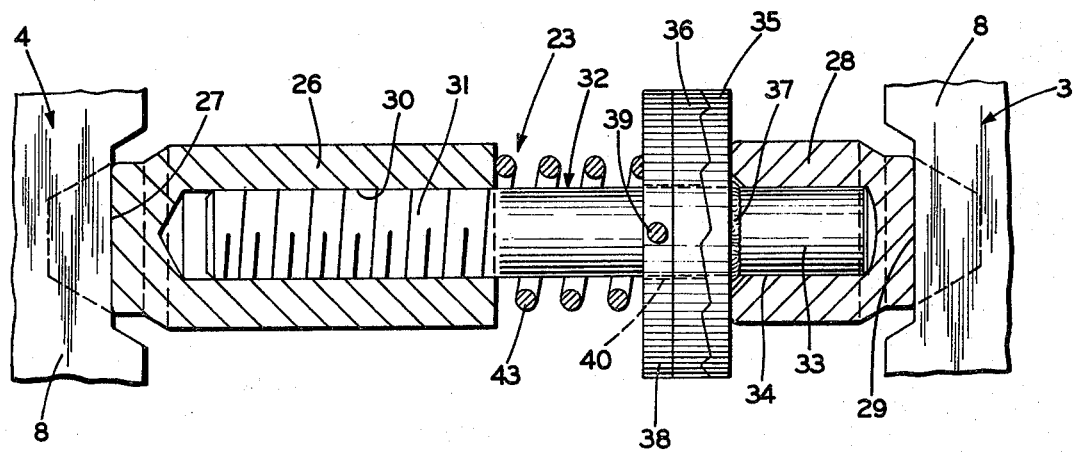
FIG. 2 is an enlarged fragmentary view, portions of which are in section, of the automatic brake gap adjuster mechanism, of the improved brake construction shown in FIG. 1.
Figure 3:
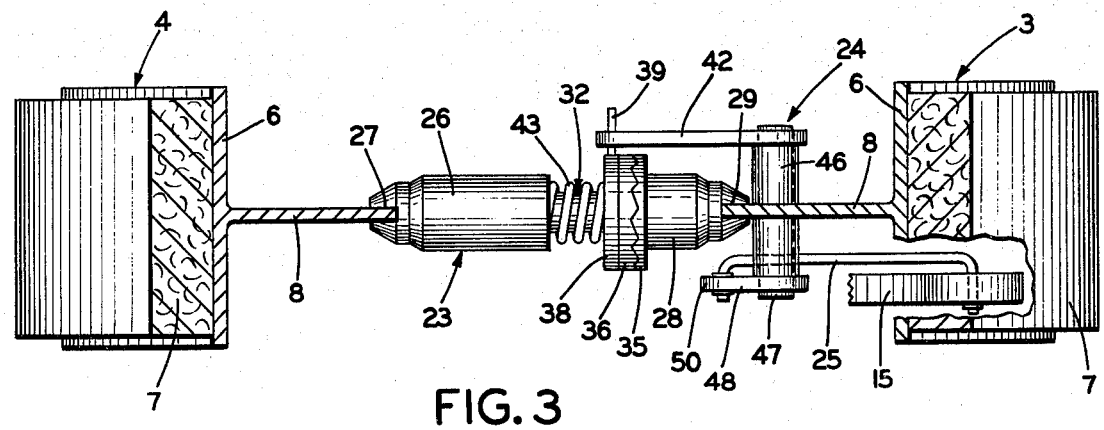
FIG. 3 is a fragmentary sectional view with portions broken away, taken on line 3—3, FIG. 1.
Figure 4:
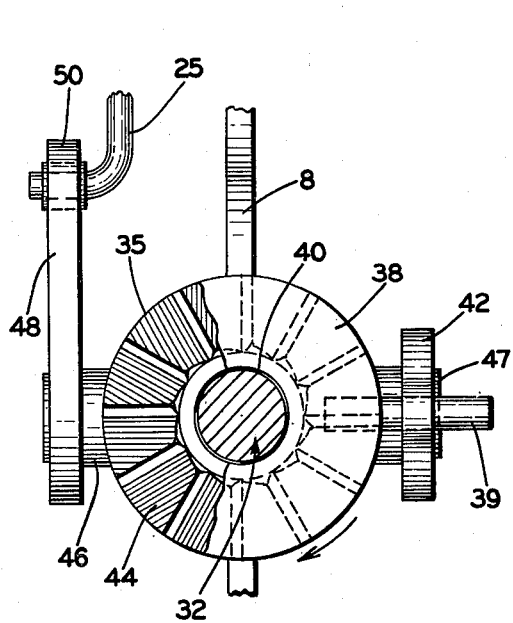
FIG. 4 is an enlarged fragmentary sectional view taken on line 4—4, FIG. 1.

In accordance with the invention, an improved self-adjusting assembly indicated generally at 22 extends between the lower ends of brake shoes 3 and 4 and is operatively connected to brake shoe 4 and lever 11. Assembly 22 includes a self-adjusting strut 23 (FIG. 2), a bellcrank control lever 24, and a connecting push rod 25 (FIGS. 1, 3 and 4).

Strut 23 is mounted on the lower ends of brake shoes 3 and 4 and extends therebetween in a similar manner as does a usual manually adjustable starwheel or ratchet wheel strut. Strut 23 (FIG. 2) includes a first tubular sleeve member 26 having a slotted end 27 engaged with brake shoe 4, and a second tubular sleeve member 28 having a slotted end 29 engaged with brake shoe 3. A spring 9 holds the shoe ends in engagement with strut 23.

Tubular member 26 has a threaded bore 30 for engagement with a threaded portion 31 of a strut rod 32. The other end 33 of rod 32 is smooth and will rotate freely within a smooth bore 34 of tubular member 28. Rotational movement of rod 32 will expand the ends of brake shoes 3 and 4 outwardly due to the outward advancement of threaded rod portion 31 from within bore 30.

one of the main features of improved self-adjusting strut 23 is a pair of slip-type cam washers 35 and 36 mounted on strut rod 32. Washers 35 and 36 are inexpensive readily available components, which have numerous uses other than use in self-adjusting brake constructions, thereby enabling a low cost self-adjusting brake to be made. Washer 35 is fixed to rod 32 by welds 37 adjacent smooth rod end 33 so as to rotate with rod 32. Washer 36 is mounted on a reinforcing washer 38 to increase the axial thickness of washer 36 to permit embedding a control pin 39 therein. Washers 36 and 38 have enlarged central openings 40 so as to be freely rotatable on strut rod 32. Pin 39 extends outwardly from washer 38 and projects through a slot 41 formed in the end of a first lever arm 42 of bellcrank lever assembly 24.

A compression spring 43 is telescopically mounted on rod 32 between tubular member 26 and washer 38, biasing washer 36 into driving engagement with washer 35. Washers 35 and 36 are formed with a plurality of circumferentially spaced ratchet teeth or camming surfaces 44 and 45, respectively, on abutting radially extending surfaces thereof which provide the driving engagement therebetween when washers 35 and 36 are rotated in a clockwise direction, as viewed in FIG. 4.

Bellcrank assembly 24 is pivotally mounted on web 8 of brake shoe 3 by a journal sleeve 46 and pin 47 (FIG. 1 and 3). Lever arm 42 is fixed to one end of pin 47 and a second lever arm 48 is fixed to the other end of pin 47 and extends inwardly toward the center of backing plate 2 and is located between plate 2 and brake shoe web 8. Lever arm 48 is adjusted to a predetermined angle with respect to lever arm 42 depending upon the particular brake size and arrangement of the various brake components.

Push rod 25 is a rigid member capable of transmitting compression forces from brake lever 15 to bellcrank assembly 22. Rod 25 is loosely engaged at one end within a hole 49 in swinging end 50 of lever arm 48 and within a hole 51 of brake lever portion 15.

The operation of improved self-adjusting brake construction 1 is set forth below. Brake shoes 3 and 4 are shown in their unactuated retracted positions in FIG. 1, with brake lining 7 being spaced from brake drum 5. The space 52 between lining 7 and drum 5 is referred to as the "brake gap".

Depression of the vehicle brake pedal by an operator actuates hydraulic cylinder 10, which moves the cylinder pistons outwardly. This outward movement of the cylinder pistons pivots levers 11 and 12 in the directions of arrow A and B, respectively, about pivot pins 13 (FIG. 1). Lever portions 14 transmit the thrust forces of the pistons to brake shoes 3 and 4 through a sliding camming action of arcuate lever edges 17 along brake shoe camming edges 18. The upper portions of the brake shoes move outwardly through brake gap 52 until engaging rotating brake drum 5. The braking forces are distributed evenly along brake shoe linings 7 by the sliding pivotal movement of the brake shoes and adjuster strut 23 in a usual manner as in numerous brake constructions.

In accordance with the invention, the inward pivotal movement of end 16 of brake lever 11 automatically adjusts brake gap adjuster 23 through push rod 25 and bellcrank lever 24. The inward swinging movement (arrow C, FIG. 1) of lever end portion 16 moves link 25 in the general direction of arrow D, subsequently pivoting bellcrank lever 24 in a counterclockwise direction about pin 47. The counterclockwise movement of lever arm 42 rotates connected washers 36 and 38 in a clockwise direction as viewed in FIG. 4, through the engagement of washer pin 39 in slot 41 of arm 42.

Rotation of washer 36 is transmitted to washer 35 through the meshing, driving engagement of ratchet teeth 45 of washer 36 and ratchet teeth 44 of washer 35. Rotation of washer 35 rotates connected strut rod 32, which in turn advances rod 32 axially out of tubular sleeve 26 due to the threaded engagement of rod end 31 within threaded bore 30. The distance of this outward advancement of strut rod 32 from sleeve 26 is directly proportional to the amount of rotation of washer 35, which in turn is dependent upon the inward swing of lever end 16. Likewise, the amount of inward swing of lever end 16 is directly proportional to the distance of travel of brake shoe lining 7 required to contact brake drum 5, in other words the radial length of brake gap 52.

Strut smooth end 33 rotates freely within hollow bore 34 of sleeve 28 as rod 32 rotationally advances out of sleeve 26 to increase the separation of the lower brake shoe ends. Sleeves 26 and 28 are fixed against rotation due to their slotted engagements 27 and 29 with brake shoes 3 and 4. The outward advancement of strut 32 and subsequent spreading of the lower brake shoe ends moves brake lining 7 toward drum 5 to compensate for the wearing away of lining 7 in order to maintain a generally constant brake gap 52.

Springs 20 return brake shoes 3 and 4 to retracted position upon release of the vehicle brake by an operator. Levers 11 and 12, likewise, pivotally swing back to their unactuated positions due to the return sliding camming action of edges 17 and 18 of lever portions 14 and brake shoes 3-4, respectively. Washer 36 is rotated from its advanced actuated position to its unactuated position, upon return of lever end portion 16 by its connection to lever arm 42 through pin 39. Return of washers 36 and 38 to their unactuated position has no effect on the adjusted position of strut rod 32 since washers 36 and 38 are freely rotatably mounted on rod 32. Washer 35 remains in its advanced position upon return of washer 36 as shown in FIG. 6.

Figures 6, 7:
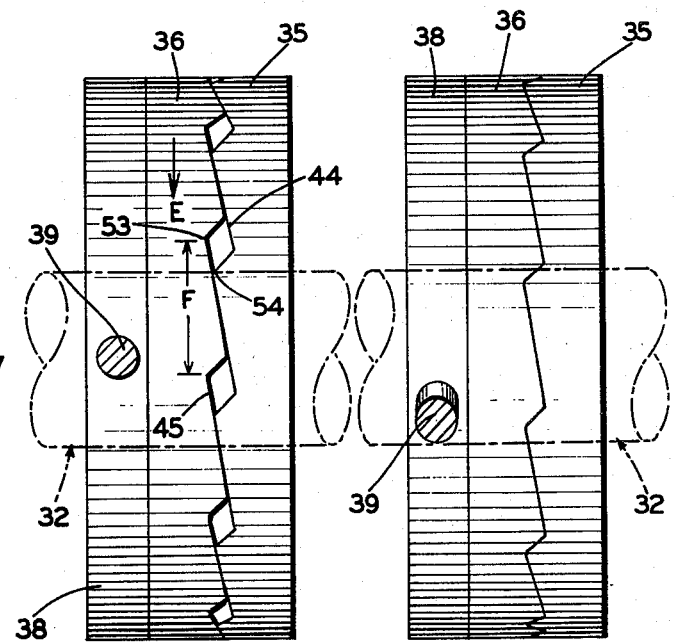
FIG. 6 is a greatly enlarged elevational view showing the camming washers of the brake gap adjuster mechanism with the driven washer in an intermediate adjusted position.
FIG. 7 is a view similar to FIG. 5 with the washers of the brake gap adjuster mechanism shown in an advanced driving engaged position.
Figure 5:
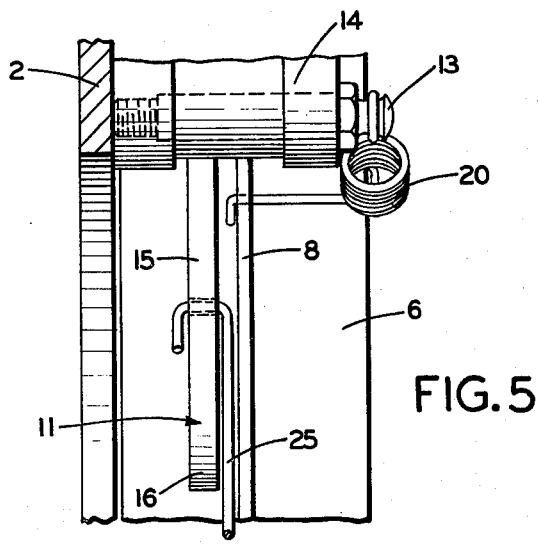
FIG. 5 is a fragmentary sectional view taken on line 5—5, FIG. 1.

The next actuation of the vehicle brakes will rotate washer 36 from its at rest position of FIG. 6 in the direction of arrow E into driving relationship (FIG. 7) with washer 35. Usually brake linings 7 will not have worn sufficiently after a single braking operation to cause further rotation of washer 35. However, as the brake lining wears by repeated brake operation, the brake shoe pivots outwardly a greater distance as lining 7 moves through a larger brake gap to contact drum 5. This increases outward movment of the brake shoe pivots lever arm 42 through a greater angle with the subsequent greater rotation of washers 36, 38 and 35.

Figure 8:
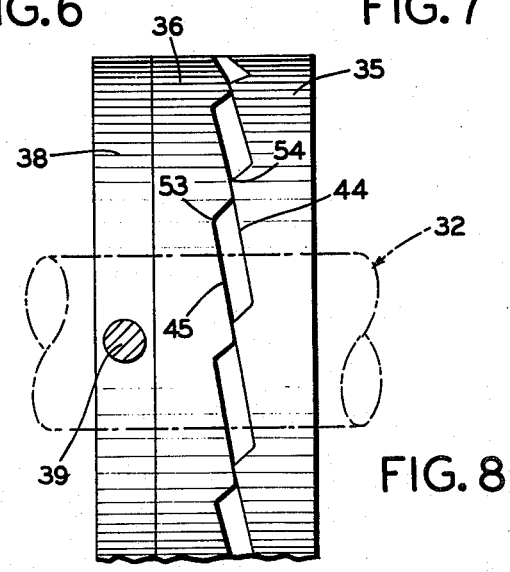
FIG. 8 is a view similar to FIGS. 6 and 7 of the camming washers, with the driven washer in an advanced adjusted position.

FIG. 8 illustrates the relative position of ratchet teeth 44 and 45 after the brake lining 7 has become worn and washer 35 has been rotated through an anlge approximately equal to the circumferential spacing (indicated by arrow F, FIG. 6) between crests 53 of teeth 45. Teeth 45 of washer 35 will "click" past the adjacent crests 54 of teeth 44 of washer 35 upon return of washer 36 to its at rest position after the next small rotational advancement of washer 35 whereupon washers 35 and 36 will assume the relative at rest position of FIG. 2 but with teeth 45 of washer 36 engaging the trailing adjacent teeth 44 of washer 35.

Rotational advancement of driven washer 35 by the engagement of teeth of driving washer 36 with 45 teeth 44 of washer 35 will be an extremely slow process, the length of time depending upon the amount and force of vehicle braking. For example, it may require hundreds of braking operations over a period of weeks or months to rotationally advance washer 35 through the arcuate length "F" of two adjacent washer teeth 45 of washer 36.

A manually actuated parking brake may be incorporated in brake construction 1 if desired. A pair of cables 55 and 56 may be connected to lever ends 16 (FIG. 1) and extend downwardly to various types of actuating control mechanisms (not shown) which are mounted on backing plate 2 adjacent strut 32. Application of such a parking brake applies a tensioning force to cables 55 and 56 pivoting lever end portions 16 inwardly in a same manner as if brake shoes 3 and 4 are actuated by hydraulic cylinder 10.

Accordingly, improved self-adjusting brake construction 1 provides a means of compensating for an increase of the brake gap due to the wearing of the brake lining in a simple, economical and rugged brake construction, in which the self-adjusting strut assembly is actuated by the inward movement of a lever member during the outward movement of the brake shoes; provides a brake construction in which the operating member, which extends between the brake shoe lever and self-adjusting strut is placed in compression instead of tension as in usual cable actuated self-adjusting arrangements; provides a self-adjusting brake construction in which the adjuster strut is of a simple and economical arrangement using a usual manually-adjusted type of strut having a pair of readily available cam ratchet washers mounted thereon, which in turn is operated by a simple bellcrank lever arrangement; provides a construction in which the adjusting strut is actuated by a positively applied force eliminating the heretofore used spring and cable actuated control arrangements; provides a construction in which the adjuster mechanism is operated by application of both the hydraulic service brake and the manually operated parking brake; and provides structures and arrangements which are very simplified, which eliminate difficulties existing in the art and which achieves the stated objectives and which solves problems which have existed in the art.

In the foregoing description certain terms have been used for brevity, clearness and understanding, but no unnecessary limitations are to be implied therefrom beyond the requirements of the prior art, because such words are used for descriptive purposes herein and are intended to be broadly construed.

Moreover, the embodiment of the improved construction illustrated and described herein is by way of example, and the scope of teh present invention is not limited to the exact details of construction shown or described.

Having now described the features, discoveries and principles of the invention, the manner in which the self-adjusting brake construction is constructed, assembled and operated, the characteristics of the new construction, and the advantageous, new and useful results obtained; the new and useful structures, devices, elements, arrangements, parts, and combinations are set forth in the appended claims.

I claim:

1. Self-adjusting brake construction including:
   a. a backing plate adapted to be rigidly mounted on a stationary part of a vehicle;
   b. first and second brake shoes movably mounted on the backing plate and expandable towards and against a brake drum, said brake shoes being arranged in end-to-end relationship on said backing plate;
   c. a brake actuator mounted on the backing plate and located between one pair of opposed ends of said brake shoes and operatively connected to said brake shoe ends whereby operation of said actuator will move said brake shoes outwardly into engagement with a brake drum;
   d. lever means pivotally mounted on the backing plate and interposed between said one end of the first brake shoe and the brake actuator, said lever means having an extended end adapted to pivot inwardly upon outward movement of said first brake shoes;
   e. brake gap adjuster means engageable with and extending between the other pair of opposed brake shoe ends; and
   f. control means including a rigid control rod operatively connected to the extended end of the lever means and to the brake gap adjuster means whereby inward movement of the lever means upon the outward movement of the first brake shoe actuates the brake gap adjuster means to automatically adjust the spacing between said other pair of opposed brake shoe ends.

2. The construction defined in claim 1 in which the control means includes a bellcrank lever pivotally mounted on the first brake shoe; in which the control rod is connected to and extends between an end of the bellcrank lever and the lever means; and in which the brake gap adjuster is operatively connected to the other end of the bellcrank lever.

3. Self-adjusting brake construction including:
   a. a backing plate adapted to be rigidly mounted on a stationary part of a vehicle;
   b. first and second brake shoes movably mounted on the backing plate and expandable towards and against a brake drum, said brake shoes being arranged in end-to-end relationship on said backing plate;
   c. a brake actuator mounted on the backing plate and located between one pair of opposed ends of said brake shoes and operatively connected to said brake shoe ends whereby operation of said actuator will move said brake shoes outwardly into engagement with a brake drum;
   d. lever means operatively connected to the first brake shoe and movable inwardly upon outward movement of the brake shoes;
   e. brake gap adjuster means including first and second tubular sleeves engageable with and extending between the other pair of opposed brake shoe ends, with said first sleeve having an internal threaded bore and the second sleeve having a smooth internal bore;
   f. rod means having opposite threaded and smooth end portions with the threaded end portion engaged within the threaded bore of the first sleeve for advancement out of said sleeve and the smooth end portion rotatably mounted within the smooth bore of the second sleeve;

g. a pair of washer means, each having a plurality of camming surfaces being mounted on the rod means with one of said washer means being rigidly mounted on the rod means and with the other of said washer means being rotatably mounted on the rod means;

h. spring means biasing the camming surfaces of the rotatably mounted washer means into driving engagement with the camming surfaces of the rigidly mounted washer means; and i. control means including a rigid control rod operatively connecting the lever means with the brake gap adjuster means whereby inward movement of the lever means upon the outward movement of the brake shoes actuates the brake gap adjuster means to automatically adjust the spacing between said other pair of opposed brake shoe ends.

4. The construction defined in claim 3, in which pin means is mounted on the rotatably mounted washer means; in which the control means includes a bellcrank lever pivotally mounted on the first brake shoe; in which the control rod is connected to one end of the bellcrank lever; and in which said pin means is operatively connected to the other end of said bellcrank lever.

5. Self-adjusting brake construction including:

a. a backing plate adapted to be rigidly mounted on a stationary part of a vehicle;

b. first and second brake shoes movably mounted on the backing plate and expandable towards and against a brake drum, said brake shoes being arranged in end-to-end relationship on said backing plate, with said brake shoes each having a curved camming edge formed on opposed ends;

c. a brake actuator mounted on the backing plate and located between the camming edges of the opposed ends of the brake shoes;

d. a pair of levers pivotally mounted on the backing plate and interposed between the camming edges of the brake shoes and the brake actuator, said levers each having an extended end which pivots inwardly upon operation of the brake actuator and curved camming edges which slidably engage the brake shoe camming edges to expand the brake shoes outwardly towards the brake drum upon operation of the brake actuator;

e. brake gap adjuster means engageable with and extending between the other pair of opposed brake shoe ends; and f. control means including a rigid control rod operatively connected to the extended end of the first lever and to the brake gap adjuster means whereby inward movement of the levers upon the outward movement of the brake shoes actuates the brake gap adjuster means to automatically adjust the spacing between said other pair of opposed brake shoe ends.

6. In combination with a rotatable brake drum of a vehicle wheel, a self-adjusting brake construction including:

a. a backing plate fixedly mounted on a stationary part of a vehicle;

b. first and second brake shoes movably mounted on the backing plate and expandable towards and against the drum, said brake shoes being arranged in end-to-end relationship on said backing plate;

c. a hydraulic brake actuator mounted on the backing plate and located between a pair of opposed ends of the first and second brake shoes;

d. first and second lever means pivotally mounted on the backing plate, each of said lever means having a thrust transmitting portion and a swinging end portion, said thrust transmitting portions being interposed between and respectively engageable with the ends of the brake actuator and said opposed ends of the brake shoes, whereby operation of said brake actuator will move said brake shoes outwardly through said interposed thrust transmitting portions of the lever means into engagement with the brake drum with the lever means swinging end portions moving inwardly;

e. a bellcrank lever pivotally mounted on the first brake shoe;

f. rigid control rod means operably connecting one end of the bellcrank lever with the swinging end portion of the first lever means;

g. brake gap adjuster means engageable with and extending between the other pair of opposed brake shoe ends;

h. said adjuster means having a pair of camming members spring biased into driving engagement with each other; and i. connection means operatively connecting said camming members with the bellcrank lever whereby the inward movement of the swinging end of the first lever means is transmitted through the rigid control rod means in compression to the bellcrank lever to rotate the camming members and adjust the spacing between the brake shoes and drum.

7. The construction defined in claim 6, in which the brake gap adjuster means includes first and second tubular sleeves, said first sleeve having an internally threaded bore and said second sleeve having a smooth internal bore; in which rod means having a threaded end portion is threadably engaged within the threaded bore of the first sleeve for advancement out of said sleeve, and in which the rod means has a smooth opposite end portion rotatably mounted within the smooth bore of the second sleeve; in which the camming members are washers each having a plurality of camming surfaces; in which one of said camming washers is rigidly mounted on the rod means and the other of said camming washer is rotatably mounted on the rod means; and in which the spring means biases the camming surfaces of the rotatably mounted washer into driving engagement with the camming surface of the rigidly mounted washer.

8. The construction defined in claim 7 in which the connection means between the camming members and the bellcrank lever includes pin means mounted on and extending outwardly from the rotatably mounted camming washer; in which a slot is formed in an end of the bellcrank lever; and in which said pin means is operatively engaged within said bellcrank lever slot.

9. The construction defined in claim 6 in which the swinging end portions of the first and second lever means are located between the backing plate and brake shoes; in which the bellcrank lever has first and second lever arms; and in which said first lever arm is mounted outwardly of the first brake shoe with said second lever arm being mounted inwardly of said first brake shoe between said brake shoe and the backing plate.

* * * * *

UNITED STATES PATENT AND TRADEMARK OFFICE
CERTIFICATE OF CORRECTION

PATENT NO. : 3,999,636
DATED : December 28, 1976
INVENTOR(S) : Gary B. Schumacher It is certified that error appears in the above-identified patent and that said Letters Patent are hereby corrected as shown below:

Column 2, line 37, change "sefl-adjusting" to -self-adjusting-;

Column 3, line 57, Make new paragraph beginning with "FIG. 4 is an" through "line 4-4, FIG. 1;";

Column 4, line 26, change "cylinde" to -cylinder-;

Column 4, line 36, change "627,250" to -627,542-;

Column 4, line 37, change "30" to -31-;

Column 5, line 21, change "wash er" to -washer-;

Column 6, line 64, change "35" to -36-; and

Column 7, line 57, change "teh" to -the-.

Signed and Sealed this

Twenty-second Day of March 1977

[SEAL]

Attest:

RUTH C. MASON
*Attesting Officer*

C. MARSHALL DANN
*Commissioner of Patents and Trademarks*